US008172092B2

(12) United States Patent
Green et al.

(10) Patent No.: US 8,172,092 B2
(45) Date of Patent: May 8, 2012

(54) FILTER HAVING MELT-BLOWN AND ELECTROSPUN FIBERS

(75) Inventors: Thomas B. Green, Liberty Township, OH (US); Lei Li, West Chester, OH (US)

(73) Assignee: Clarcor Inc., Franklin, TN (US)

( * ) Notice: Subject to any disclaimer, the term of this patent is extended or adjusted under 35 U.S.C. 154(b) by 519 days.

(21) Appl. No.: 12/357,499

(22) Filed: Jan. 22, 2009

(65) Prior Publication Data

US 2010/0181249 A1    Jul. 22, 2010

(51) Int. Cl.
*B01D 39/00* (2006.01)
(52) U.S. Cl. ............ 210/491; 210/493.1; 210/505; 210/508; 55/487; 156/166; 156/296
(58) Field of Classification Search .......... 210/489, 210/491, 493.1, 505, 507, 508; 55/486, 487; 156/166, 296
See application file for complete search history.

(56) References Cited

U.S. PATENT DOCUMENTS

| | | | |
|---|---|---|---|
| 3,994,258 A | 11/1976 | Simm | |
| 4,230,650 A | 10/1980 | Guignard | |
| 4,650,506 A | 3/1987 | Barris et al. | |
| 4,759,782 A | 7/1988 | Miller et al. | |
| 5,672,399 A | 9/1997 | Kahlbaugh et al. | |
| 5,782,944 A | 7/1998 | Justice | |
| 6,171,684 B1 | 1/2001 | Kahlbaugh et al. | |
| 6,604,925 B1 | 8/2003 | Dubson | |
| 6,641,773 B2 | 11/2003 | Kleinmeyer et al. | |
| 6,673,136 B2 | 1/2004 | Gillingham et al. | |
| 6,709,480 B2 | 3/2004 | Sundet et al. | |
| 6,743,273 B2 | 6/2004 | Chung et al. | |
| 7,008,465 B2 * | 3/2006 | Graham et al. | 210/505 |
| 7,086,846 B2 | 8/2006 | Kleinmeyer et al. | |
| 7,134,857 B2 | 11/2006 | Andrady et al. | |
| 7,318,852 B2 | 1/2008 | Chung et al. | |
| 7,754,123 B2 * | 7/2010 | Verdegan et al. | 264/122 |
| 2006/0290031 A1 | 12/2006 | Jirsak et al. | |
| 2007/0021021 A1 | 1/2007 | Verdegan et al. | |
| 2007/0102372 A1 * | 5/2007 | Ferrer et al. | 210/767 |
| 2007/0163217 A1 | 7/2007 | Frey et al. | |
| 2007/0294988 A1 | 12/2007 | Miller et al. | |
| 2008/0017038 A1 | 1/2008 | Wu | |
| 2008/0110342 A1 * | 5/2008 | Ensor et al. | 96/54 |
| 2008/0134652 A1 * | 6/2008 | Lim et al. | 55/486 |
| 2009/0032475 A1 * | 2/2009 | Ferrer et al. | 210/505 |
| 2009/0199717 A1 * | 8/2009 | Green et al. | 96/12 |
| 2009/0249956 A1 * | 10/2009 | Chi et al. | 95/284 |
| 2009/0266759 A1 * | 10/2009 | Green | 210/489 |
| 2010/0043639 A1 * | 2/2010 | Fox et al. | 96/74 |
| 2010/0139224 A1 * | 6/2010 | Lim et al. | 55/486 |

OTHER PUBLICATIONS

U.S. Appl. No. 60/989,218, filed Nov. 20, 2007, Green et al.
U.S. Appl. No. 61/047,455, filed Apr. 24, 2008, Li et al.
U.S. Appl. No. 61/047,459, filed Apr. 24, 2008, Green.
U.S. Appl. No. 12/271,322, filed Nov. 14, 2008, Green et al.

* cited by examiner

*Primary Examiner* — Christopher Upton
(74) *Attorney, Agent, or Firm* — Reinhart Boerner Van Deuren P.C.

(57) ABSTRACT

A multi-layer filter media including at least one layer of melt-blown fiber filter media and at least one layer of electrospun nanofiber filter media is provided. The multi-layer filter media of the present invention is configured such that the at least one layer of the melt-blown fiber filter media is on the upstream and the at least one electrospun nanofiber filter media is positioned downstream of the at least one melt-blown fiber filter media.

23 Claims, 7 Drawing Sheets

FILTER HAVING MELT-BLOWN AND ELECTROSPUN FIBERS

FIELD OF THE INVENTION

This invention generally relates to a filter media, and in particular to a multi-layer filter media comprising melt-blown fiber filter media layers and electrospun nanofiber media layers, and method of making the same.

BACKGROUND OF THE INVENTION

Fluid streams such as liquid flows and gaseous flows (e.g. air flows) often carry particulates that are often undesirable contaminants entrained in the fluid stream. Filters are commonly employed to remove some or all of the particulates from the fluid stream.

Filter media including fine fibers formed using an electrostatic spinning process is also known. Such prior art includes Filter Material Construction and Method, U.S. Pat. No. 5,672,399; Cellulosic/Polyamide Composite, U.S. Patent Publication No. 2007/0163217; Filtration Medias, Fine Fibers Under 100 Nanometers, And Methods, U.S. Provisional Patent Application No. 60/989,218; Integrated Nanofiber Filter Media, U.S. Provision Patent Application No. 61/047,459; Filter Media Having Bi-Component Nanofiber Layer, U.S. Provisional Patent No. 61,047,455, the entire disclosures of which are incorporated herein by reference thereto as nanofibers and methodologies according to the foregoing may be utilized in embodiments of the present invention.

Electrospun nanofiber medias provide an excellent filter efficiency; however, its filter life span is relatively short due to heavy particle loading facilitated by nano pore sizes of the electrospun nanofiber medias. The present invention is directed toward improvements over the state of art of filter medias incorporating electrospun nanofibers.

BRIEF SUMMARY OF THE INVENTION

In one aspect, the invention provides a multi-layer filter media including at least one melt-blown fiber filter media layer and at least one electrospun nanofiber media layer downstream of the at least one melt-blown fiber filter media layer. The at least one melt-blown fiber filter media layer has substantial depth loading capability that appears to avoid clogging of the electro-spun fibers layer. Specifically, new filtration advantages are shown to occur with an upstream depth media selection having parameters including a basis weight of greater than 40 grams/m2, a typical thickness of at least 1 mm, and a median fiber diameter of at least 1 micron and less than 50 micron. The at least one electrospun nanofiber media layer includes fibers having a median fiber diameter of less than 0.8 micron and having a basis weight of greater than 0.01 grams/m2.

In another aspect, the invention provides a method of forming a multi-layer filter media. The method includes a step of providing a melt-blown fiber filter media layer, a step of electrospinning a nanofiber media layer, and step of bonding the nanofiber layer to downstream of the melt-blown fiber filter media layer Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The following disclosure will discuss particular embodiments of a multi-layer filter media including at least one layer of melt-blown fiber filter media and at least one layer of electrospun nanofiber media according to embodiments of the present invention. Moreover, representative methods and systems for making such filter media are explained. Further, new filtration results for an economical and practical filtration media are also disclosed according to some embodiments.

Multi-Layer Filter Media

Figure 1:
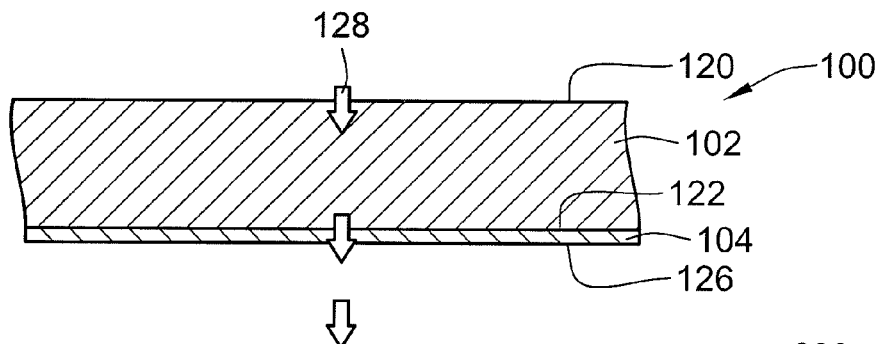
FIG. 1 is a schematic cross sectional illustration of a multi-layer filter media including a melt-blown fiber filter media layer and an electrospun nanofiber media layer according to one embodiment of the present invention.

FIG. 1 is a schematic cross sectional illustration of a multi-layer filter media 100 including a melt-blown fiber filter media layer 102 and an electrospun nanofiber media layer 104 according to one embodiment of the present invention. The multi-layer filter media 100 is configured such that the melt-blown fiber filter media layer 102 is on the upstream and the electrospun nanofiber media layer 104 is on the downstream.

In the multi-layer filter media 100, a particulate laden fluid, such as dust particle laden air, enters the upstream side 120 of the melt-blown fiber filter media layer 102, and flows through the melt-blown fiber filter media layer 102 and the electrospun nanofiber media layer 104, wherein particles in the fluid are captured within the depth of the each layer; then the filtered fluid exits out through the downstream side 126 of the electrospun nanofiber media layer 104, as shown by a flow path 128. This configuration provides the high filter efficiency characteristic of the electrospun nanofiber media layer while improving the filter life by adding the melt-blown fiber filter media on the upstream. The melt-blown fiber filter media provides substantial depth loading capability to trap particles prior to the efficiency layer.

One common parameter characteristic of filter media is the "efficiency" of the filter media. Efficiency is the propensity of the media to trap particulates as opposed to allowing the particulates to not be filtered and instead pass through the media. Another common characteristic is pressure drop across the media, which often has traditionally related to the porosity of the media. The pressure drop relates to how restrictive the filter media is to fluid flow. Larger pore sizes typically have allowed for greater fluid flow, but also unfortunately typically result in more particulates being passed. As a result, often efficiency is at odds with pressure drop. In particular, while it is often desirable to trap a large amount of particulates, providing such a high efficiency often has had the undesirable effect of increasing the restrictiveness of the media and therefore the pressure drop across the media.

Efficiency often means or refers to the initial efficiency, that is the efficiency of the filter media post manufacture but prior to usage and being loaded with particulates. During use, filter media traps and thereby picks up and traps particulates as a dust cake and/or otherwise within the media. These filtered-out particulates plug the larger holes in the media thereby preventing holes for smaller particles to pass and thereby increases the efficiency of the media over time to an operating efficiency greater than the initial efficiency. However, by plugging fluid flow paths, such filtered out particulates also eliminate or partially clog a fluid passageway and thereby increase the pressure drop across the media making it more restrictive to fluid flow.

Usually, filter lifespan is determined by the pressure drop across the filter. As more and more particles are filtered out of the fluid flow and trapped by the filter media, the filter media becomes more restrictive to fluid flow. As a result, the pressure drop across the filter media becomes higher. Eventually, the media becomes too restrictive, resulting in insufficient amount of fluid flow for fluid needs of the given application. Filter change intervals are calculated to coincide approximately with such an event (e.g. prior to reaching an insufficient fluid flow situation). Filter change intervals may also be determined through sensors that measure pressure drop load across the media.

Generally, an electrospun nanofiber media can provide a superior filtration efficiency. This is because smaller diameter nanofibers can be packed together without increasing the overall solidity of the media, given the fact that smaller fibers take up less volume than larger fibers. Thus, an electrospun nanofiber media can effectively capture fine particles which a filter media formed of coarse fibers, such as a melt-blown fiber filter media, may not capture. However, larger size particles can quickly plug pores on the upstream surface of the electrospun nanofiber media, thereby increasing the pressure drop of the filter media to unacceptable levels to shorten the filter life. The multi-layer filter media 100 of the present invention improves upon the such filter medias by distributing loading of particles, wherein larger size particles are captured throughout the depth of the melt-blown fiber filter media layer 102 and smaller particles are captured within the depth of the electrospun nanofiber media layer 104, thereby maintaining the high filtration efficiency while improving the filter life.

Therefore, the multi-layer filter media 100 is well suited for a depth media As configured, the multi-layer filter media 100 also provides improvements over conventional depth medias. Because depth medias load with particulates substantially throughout the volume or depth, depth media arrangements can be loaded with a higher weight and volume of particulates as compared with surface loaded systems over the lifespan of the filter. Usually, however, depth media arrangements suffer from efficiency drawbacks. To facilitate such high loading capacity, a low solidity of media is often chosen for use. This results in large pore sizes that have the potential to allow some particulates to pass more readily. The multi-layer filter media 100, as discussed above, provides for both high filtration efficiency and high loading capacity to improve the filter life by including multiple layers of filter medias, wherein each layer provides different filtration characteristics.

Figure 11:
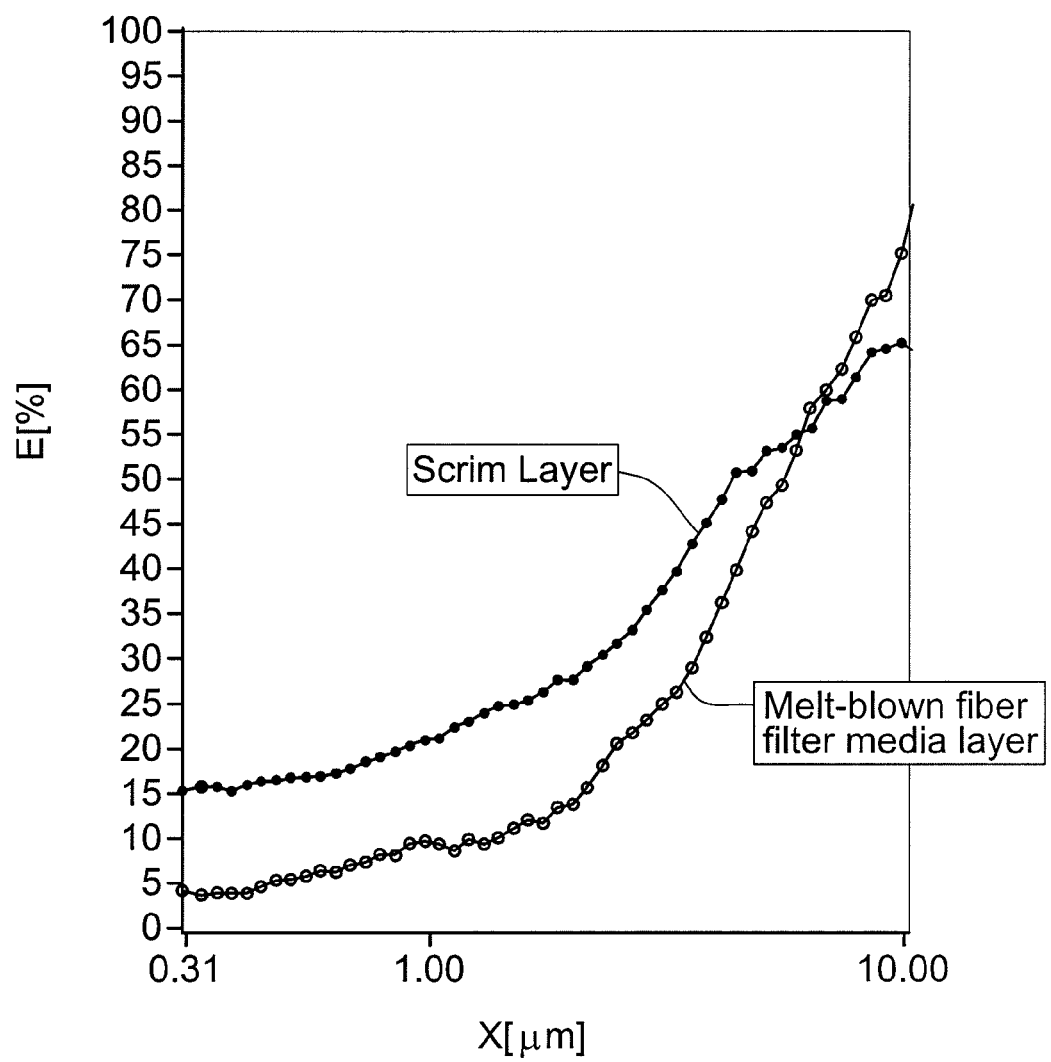
FIG. 11 is a graphical illustration of filtration efficiency test results of a melt-blown filter media and scrim according to an embodiment of the present invention.

In one embodiment, the melt-blown fiber filter media layer 102 has a thickness preferably of at least 1 mm, typically between 1.0 mm and 6.0 mm, preferably between 1 mm and 3 mm, and in one embodiment about 1.5 mm; and a basis weight greater than 40 grams/m$^2$, preferably between 40 grams/m$^2$ and 150 grams/m$^2$, and more preferably between 80 and 120 grams/m$^2$. The fibers of the melt-blown fiber filter media layer 102 have a median fiber diameter of between 1 μm and 500 μm and preferably between 10 μm to 20 μm. The melt-blown fiber filter media layer 102 has Frazier air permeability at a differential pressure of 0.5 inch of water between 300 CFM and 700 CFM, preferably between 400 CFM and 600 CFM, more preferably about 500 CFM. Filtration efficiency of the melt-blown fiber filter media layer 102 can be characterized by comparing the number of dust particulates with the particle size ranging from 0.3 μm to 10 μm on the upstream and downstream sides of the media measured using PALAS MFP-2000 (Germany) equipment. In one embodiment the filtration efficiency of a filter media selected for the melt-blown fiber filter media layer 102 is measured using ISO Fine dust having 70 mg/m$^3$ dust concentration, a sample testing size of 100$^2$ cm, and face velocity of 20 cm/s. The filtration efficiency of the melt-blown filter media layer 102 measured according to these parameters is shown in FIG. 11.

The melt-blown fiber filter media layer may be formed via a conventional melt blowing process as it will be explained in detail below. Alternatively, a suitable melt-blown fiber filter media may be selected from generally commercially available filter media. For example, melt-blown filter media suitable for the melt-blown fiber filter media layer 102 is available in various thicknesses (usually in a range of between 0.006 to 0.010 inches of thickness) from suppliers including among others Ahlstrom Engine Filtration, LLC, of Madisonville, Ky. and Hollingsworth & Voss Company, East Walpole, Mass.

The electrospun nanofiber media layer 104 has a thickness typically between 50 nm and 5 μm, preferably between 100 nm and 500 nm; and a basis weight between 0.001 grams/m$^2$ and 0.05 grams/m$^2$, preferably between 0.01 grams/m$^2$ and 0.02 grams/m$^2$, and in one embodiment about 0.013 grams/m$^2$. The fibers of the electrospun media layer 102 have a median fiber diameter of less than about 1 micron, and more typically less than 0.8 micron, and more preferably between 50 and 700 nanometers, or less. The electrospun fiber filter media is formed via the electrospinning process using a suitable polymeric material(s) as will be explained in detail below.

Figure 2:
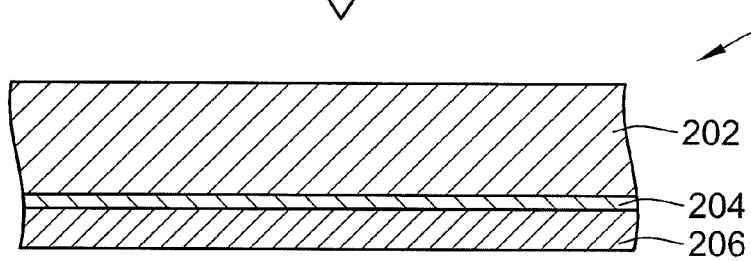
FIG. 2 is a schematic cross sectional illustration of a multi-layer filter media including a melt-blown fiber filter media layer, an electrospun nanofiber media layer and a scrim layer according to a different embodiment of the present invention.

FIG. 2 shows a schematic cross sectional illustration of a multi-layer filter media 200 including a melt-blown fiber filter media layer 202, an electrospun nanofiber media layer 204 and a scrim layer 206 according to a different embodiment of the present invention. The multi-layer filter media 200 is configured similar to the multi-layer filter media 100 of FIG. 1, except the additional scrim layer 202 on the downstream of the electrospun nanofiber media layer 204. As such, the multi-layer filter media 200 includes three layers with the melt-blown filter media layer 202 on the upstream and the scrim layer 206 on the downstream with the electrospun nanofiber media layer 204 sandwiched between them. In this configuration, the electrospun nanofiber media layer 204 is protected by the melt-blown filter media layer 202 and the scrim layer 206 during handling and any subsequent processes, such as pleating. Preferably, the medias of the present application are arranged in pleated, corrugated, gathered or otherwise consolidated structural configuration (which is a generic term herein to cover such structures) as opposed to planar and flat, such as examples disclosed in Self-Supporting Pleated Panel Filter, U.S. Pat. No. 6,709,480 to Sundet et al.; Moisture Resistant Air Filter, U.S. Pat. No. 5,782,944 to Justice; and Panel Filter with Frame, U.S. Pat. Pub. No. 2007-0294988 assigned to the present assignee, the entire disclosures of which are incorporated herein by reference thereto.

Figure 9:
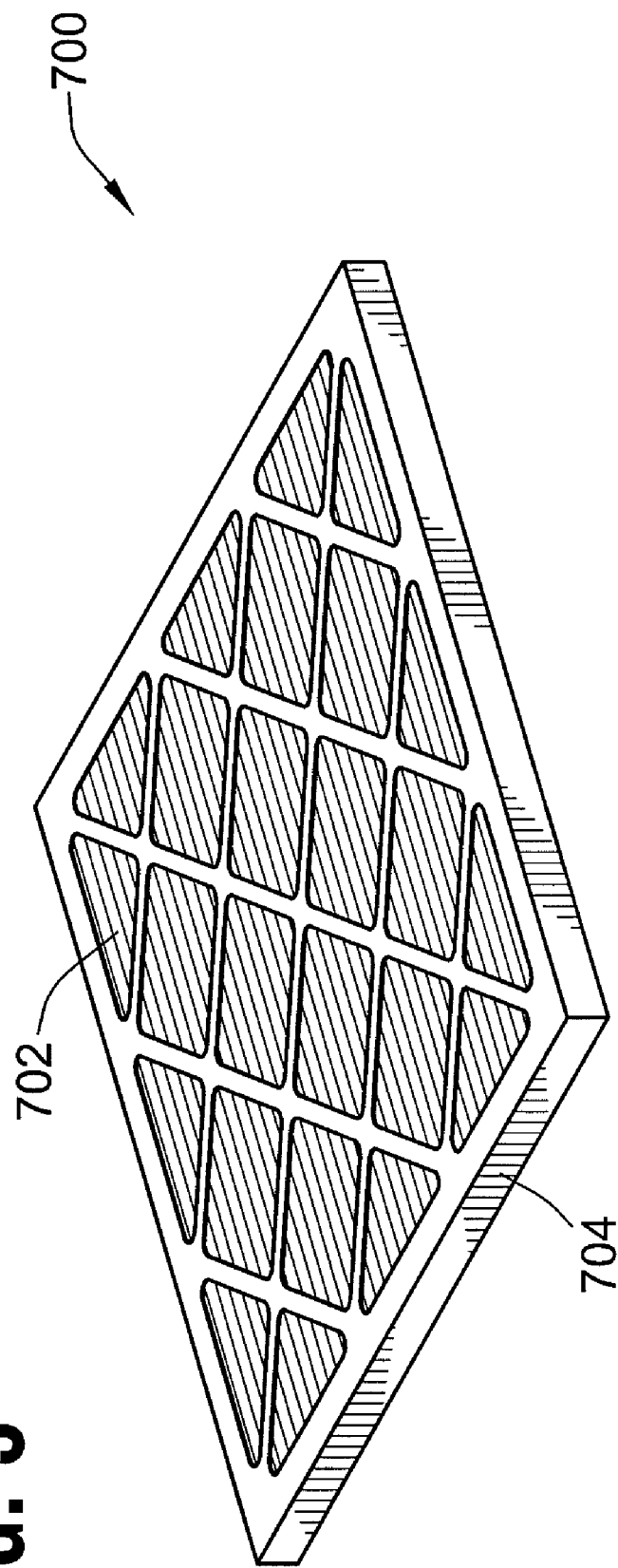
FIG. 9 is a perspective illustration of a panel filter according to an embodiment of the present invention including a pleated filter media and a frame.
Figure 10:
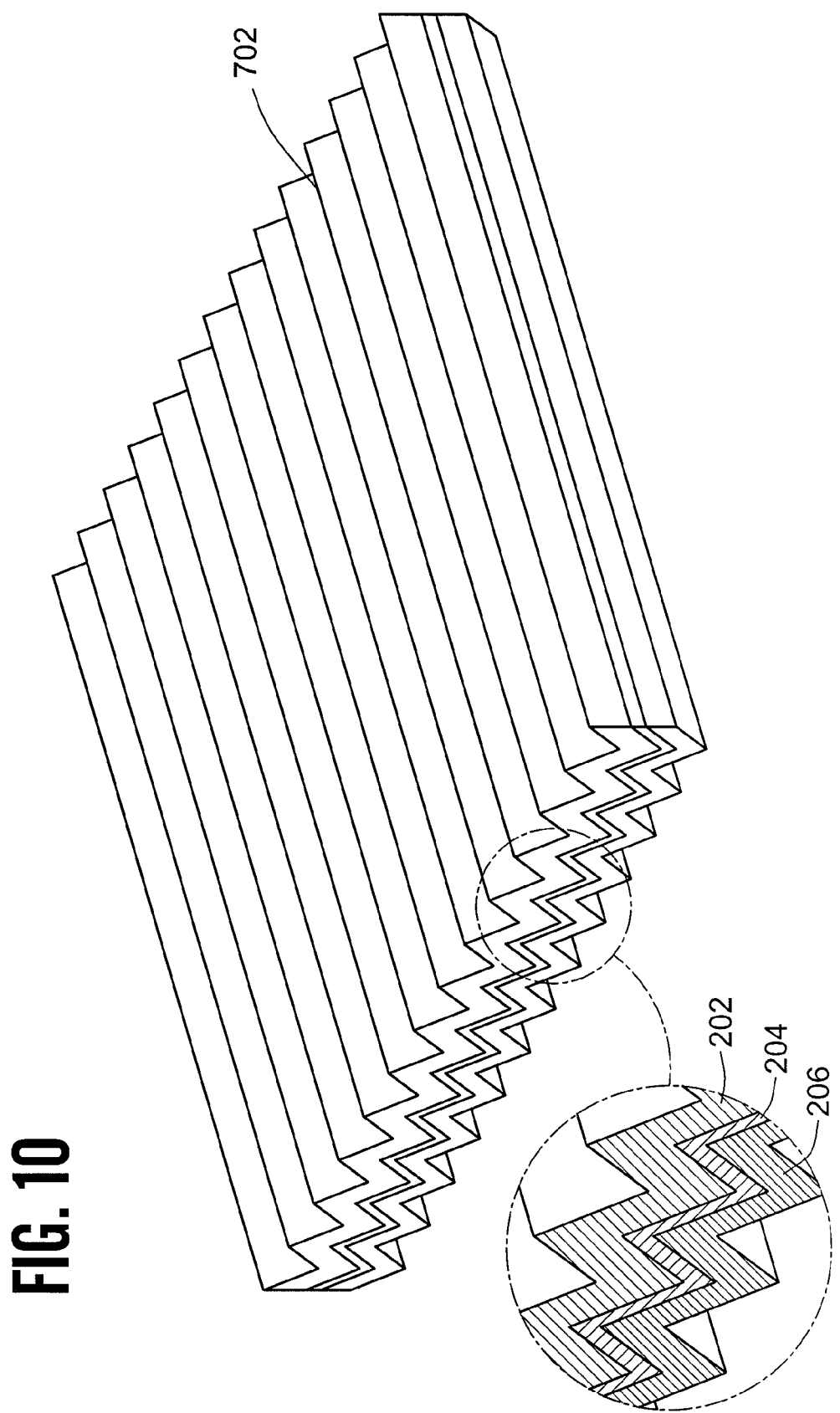
FIG. 10 is a perspective illustration of the pleated filter media of FIG. 9 formed of the multi-layer filter media of FIG. 2.

The multi-layer filter media of the present application is well suited for a HVAC media such as a panel filter media. Panel air filters are generally used for filtering air in forced air systems such as furnaces and ventilation systems. Panel air filters generally comprise a panel of filter media surrounded and supported by a paperboard frame. One common type of filter media used in panel filters is pleated filter media that includes a plurality of peaks and valleys. FIG. 9 shows an example of panel filter 700 including a pleated filter media 702 and a frame 704. The pleated filter media 702 may be formed of a multi-layer filter media constructed according to an embodiment of the present invention. For example, the pleated filter media 702 may be formed of the multi-layer filter media 200 of FIG. 2 as described above. The pleated filter media 702 formed of the multi-layer filter media 200 is shown in FIG. 10. The multi-layer filter media according to embodiments of the present invention provides an economical filter media suitable for HVAC industry while improving filtration capabilities of the conventional panel filters.

In addition to providing protection to the electrospun nanofiber media layer 204, the scrim layer 206 may include a sizeable filtration capacity and efficiency or may have little or no filtration capacity or efficiency. In one embodiment, scrim layer 206 has a thickness between 0.1 mm and 0.5 mm, preferably between 0.2 mm and 0.3 mm, and in one embodiment about 0.25 mm; and a basis weight between 30 grams/m$^2$ and 70 grams/m$^2$, preferably between 40 grams/m$^2$ and 60 grams/m$^2$. The fibers of scrim layer 206 have a median fiber diameter of between 1 μm and 50 μm, preferably between 5 μm and 30 μm, and more preferably between 10 μm to 20 μm. The scrim layer 206 has Frazier air permeability at a differential pressure of 0.5 inch of water between 400 CFM and 700 CFM, preferably between 500 CFM and 550 CFM. Filtration efficiency of the scrim layer 206 can be characterized by comparing the number of dust particulates with the particle size ranging from 0.3 μm to 10 μm on the upstream and downstream sides of the scrim measured using PALAS MFP-2000 (Germany) equipment. In one embodiment the filtration efficiency of a scrim selected for the scrim layer 206 is measured using ISO Fine dust having 70 mg/m$^3$ dust concentration, a sample testing size of 100$^2$ cm, and face velocity of 20 cm/s. The filtration efficiency of the scrim layer 206 measured according to these parameters is shown in FIG. 11.

A suitable scrim may be selected from generally commercially available scrims, or formed via spun bonding process or carding process using a suitable polymer. A suitable polymer for the scrim includes but not limited to polyester, polypropylene, polyethylene and polyamide. For example, scrim suitable for the scrim layer 206 is available in various thicknesses from suppliers including among others Fiberweb Inc, of Old Hickory, Tenn.

Figure 3:
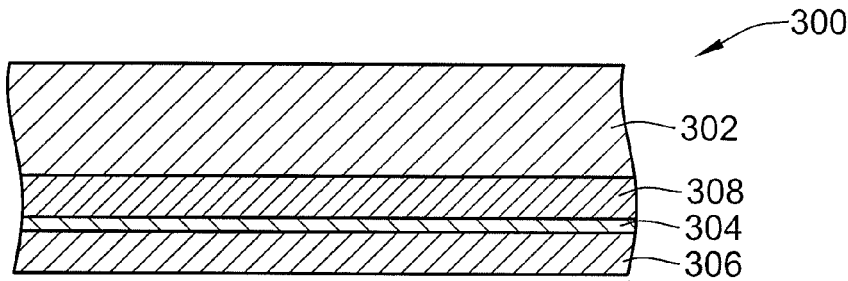
FIG. 3 is a schematic cross sectional illustration of a multi-layer filter media including a melt-blown fiber filter media layer, a scrim layer, an electrospun nanofiber media layer and another scrim layer according to an embodiment of the present invention.

FIG. 3 shows a schematic cross sectional illustration of a multi-layer filter media 300 including a melt-blown fiber filter media layer 302, an electrospun nanofiber media layer 304 and two optional scrim layers 306, 308 according to yet another embodiment of the present invention. In one embodiment the multi-layer filter media 300 does not include the optional scrim layer 306, such that it comprises the melt-blown fiber filter media layer 302, the scrim layer 308 and the electrospun nanofiber media layer 304. The multi-layer filter media 300 is configured similar to the multi-layer filter media 200 of FIG. 2, except the additional scrim layer 308 positioned between the melt-blown fiber filter media layer 302 and the electrospun nanofiber media layer 304. As such, the multi-layer filter media 300 includes four layers: the melt-blown filter media layer 302, the scrim layer 308, the electrospun nanofiber media layer 304 and the scrim layer 306, from upstream to downstream in that order. The scrim layers 306 and 308 may be formed of a same material or different materials or may have the same properties or different properties.

In one embodiment the multi-layer filter media 300 is formed by electrospinning nanofibers on the scrim layer 306 to form the electrospun nanofiber media layer 304, then subsequently laminating the melt-blown fiber filter media layer 302. In this embodiment, the scrim layer 308 protects the nanofiber layer 306 during the lamination process.

Figure 4:
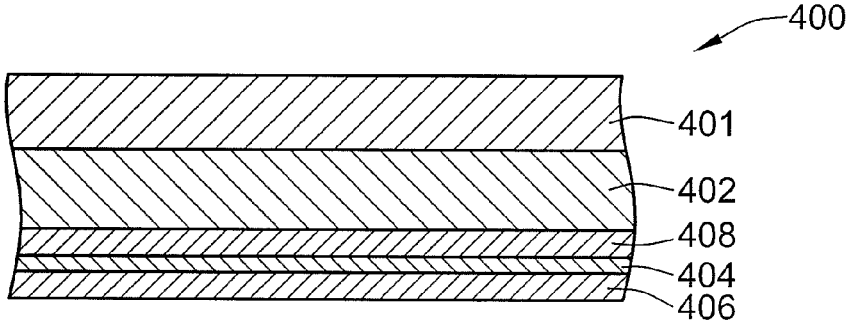
FIG. 4 is a schematic cross sectional illustration of a multi-layer filter media including two melt-blown fiber filter media layers, a scrim layer, an electrospun nanofiber media layer and another scrim layer according to another embodiment of the present invention.

FIG. 4 shows a schematic cross sectional illustration of a multi-layer filter media 400 including two melt-blown fiber filter media layers 401, 402, an electrospun nanofiber media layer 404 and two scrim layers 406, 408 according to an embodiment of the present invention. The multi-layer filter media 400 is configured similar to the multi-layer filter media 300 of FIG. 3, except the additional melt-blown fiber filter media layer 401 upstream of the melt-blown fiber filter media layer 402. As such, the multi-layer filter media 400 includes five layers: the melt-blown filter media layer 401, the melt-blown filter media layer 402, the scrim layer 408, the electrospun nanofiber media layer 404 and the scrim layer 406, from upstream to downstream in that order. The melt-blown filter media layers 401, 402 may be formed of a same material or different materials or may have the same properties or different properties. In one embodiment, the multi-layer filter media 400 has an overall thickness of between 3.0 mm and 4.0 mm. The multi-layer filter media can provide additional depth loading capabilities via the additional melt-blown fiber filter media layer.

Figure 5:
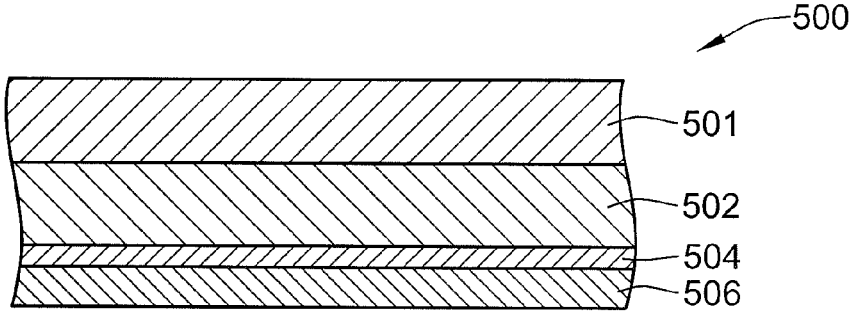
FIG. 5 is a schematic cross sectional illustration of a multi-layer filter media including two melt-blown fiber filter media layers, an electrospun nanofiber media layer and a scrim layer according to yet another embodiment of the present invention.

FIG. 5 shows a schematic cross sectional illustration of a multi-layer filter media 500 including two melt-blown fiber filter media layers 501, 502, an electrospun nanofiber media layer 504 and a scrim layer 506 according to a different embodiment of the present invention. The multi-layer filter media 500 is configured similar to the multi-layer filter media 400 of FIG. 4, except here the scrim layer between one of the melt-blown fiber filter media layer and the electrospun nanofiber media layer is excluded. As such, the multi-layer filter media 500 includes four layers: the melt-blown filter media layer 501, the melt-blown filter media layer 502, the electrospun nanofiber media layer 504 and the scrim layer 506, from upstream to downstream in that order.

The multi-layer filter medias 100, 200, 300, 400, 500 configured according to embodiments of the present invention may subsequently be further processed. For example, the multi-layer filter medias 100, 200, 300, 400, 500 may be pleated, fluted or otherwise constructed in a similar bunched up manner to increase the amount of media and surface area media for a given volume to increase filtration capacity Method of Making Multi-Layer Filter Media Now that the various embodiments of a multi-layer filter media are discussed, representative methods and systems for making such multi-layer filter media according to the present invention will be explained.

To form a multi-layer filter media according to the present invention, a filter media for the melt-blown fiber filter media layer(s) 102, 202, 302, 401, 402, 501, 502 may first be provided. As discussed above, a filter media for the melt-blown fiber filter media layers 102, 202, 302, 401, 402, 501, 502 may be selected from commercially available melt-blown fiber filter medias, or may be formed via a melt blowing process. During the melt blowing process, a molten polymer is extruded and drawn with heated, high velocity air to form fibers. The melt-blown fibers can be collected as a web on a moving screen. The melt-blown fibers may be formed of any suitable polymer, for example, polyester, polyethylene, polypropylene, etc.

For the purpose of this disclosure, the melt blowing process for forming the melt-blown fiber filter media layers 102, 202, 302, 401, 402, 501, 502 also includes other similar fiber production processes, such as spun bonding. In a typical spun-bonding process, a molten polymeric material passes through a plurality of extrusion orifices to form a multifilamentary spinline. The multifilamentary spinline is drawn in order to increase its tenacity and passed through a quench zone wherein solidification occurs which is collected on a support such as a moving screen. The spun-bonding process is similar to the melt blowing process, but melt blown fibers are usually finer than spun-bonded fibers.

The web of melt-blown fibers may then be used as a substrate layer for formation of fine fibers for the electrospun nanofiber layers the multi-layer filter media. The substrate layer provides a surface upon which a layer of electrospun nanofiber media can be supported and secured. In other embodiments, the web of melt-blown fibers is laminated with other media or scrim layers to form the multi-layer filer media, as will be explained in detail below.

Figure 6:
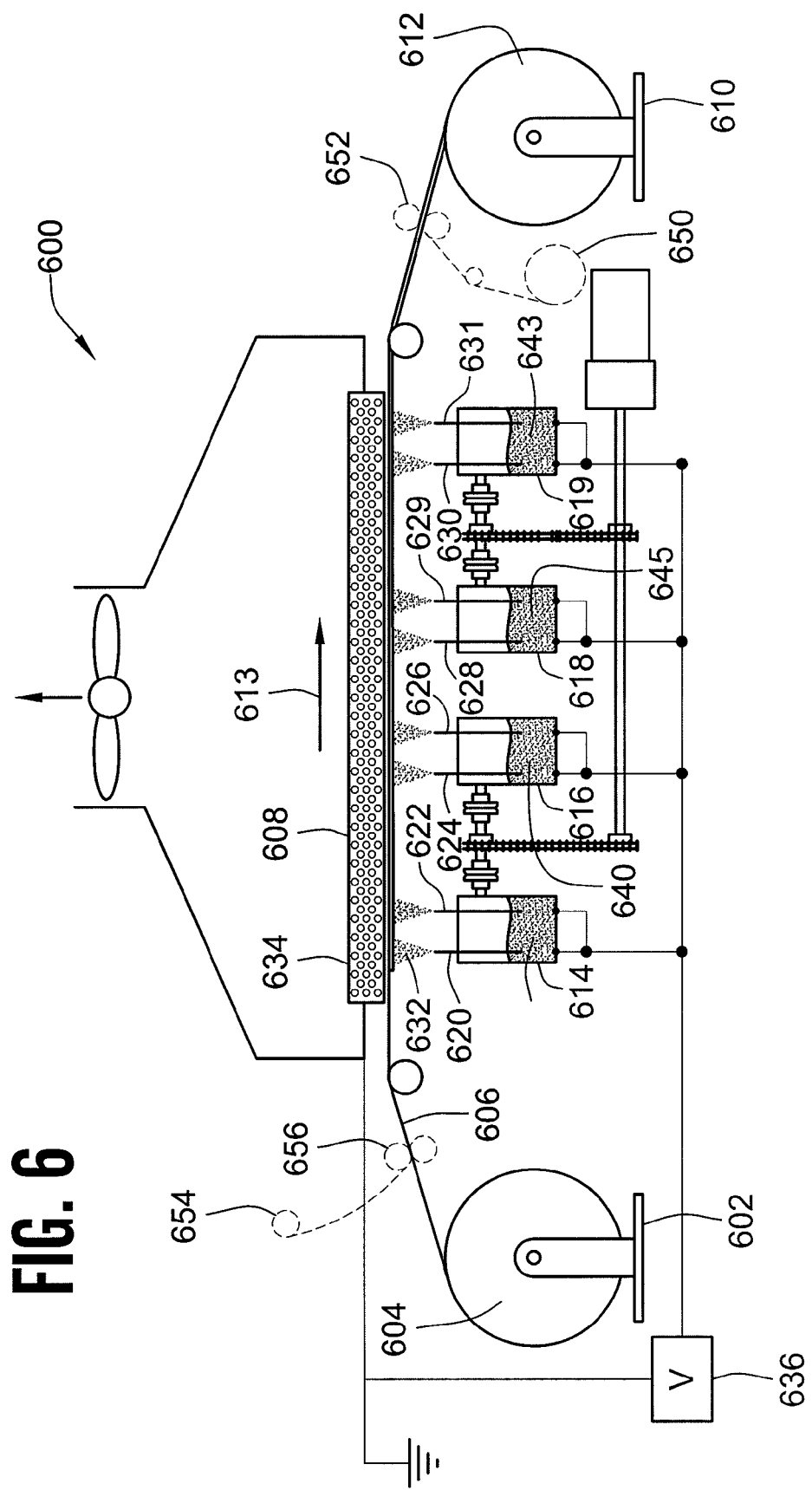
FIG. 6 is a schematic illustration of a system for making a multi-layer filter media according to one embodiment of the present invention.

System 600 for making a multi-layer filter media according to one embodiment of the present invention is schematically illustrated in FIG. 6. The system 600 includes an unwind station 602 wherein a roll of fine fiber collection substrate 604 is held and fed to system 600. The continuous substrate 606 is fed from the unwind station 602 through an electrospinning apparatus 608 for collecting fine fibers and is rewound by a rewind machine 610 into a roll of multi-layer filter media 612. As shown, the substrate 606 runs in a machine direction 613.

The substrate 606 may be a melt-blown fiber filter media layer or a scrim layer. For example, the multi-layer filter media 100 is formed using the melt-blown fiber filter media layer 102 as the substrate 606. Similarly, the multi-layer filter media 300 or 400 is formed by using the scrim layer 306, 308, 406 or 408 as the substrate 606. Further, the multi-layer filter media 200 or 500 may be formed using the melt-blown fiber filter media layer 202 or 502 or the scrim layer 206 or 506 as the substrate 606, as will be explained later.

Electrostatic spinning (electrospinning) process allows production of synthetic fibers of small diameter and high surface areas which are also known as nanofibers. The electrospinning process involves subjecting a polymeric solution to electrostatic charge in the presence of a strong electric field, such as a high voltage gradient. Introduction of electrostatic charge to polymeric fluid results in formation of a jet of charged fluid. The charged jet of polymeric fluid accelerates and thins in the electrostatic field and is attracted toward a collector. In such process, viscoelastic forces of polymeric fluids stabilize the jet, forming a small diameter fine fibers.

The electrospinning apparatus 608, as shown in FIG. 6, includes four electrospinning cells 614, 616, 618, 619. Each electrospinning cell is similar with the electrospinning cells disclosed in Nanofibers under 100 nanometers and process of making the same is disclosed in Fine Fibers Under 100 Nanometers, And Methods, U.S. Provisional Patent Application No. 60/989,218, assigned to the assignee of the present application, the entire disclosure of which are incorporated herein by reference thereto. However, other electrospinning equipment known in the art such as in the aforementioned patents may be alternatively used.

Each electrospinning cell includes electrodes 620, 622, 624, 626, 628, 629, 630, 631 whereat fine fibers 632 are formed and drawn to a collector 634 under the force provided by the electrostatic field. The electrodes may take the form of a strand, for example, an endless chain. Such chain electrode runs through a polymeric solution in the electrospinning cell and carries the polymeric solution for electrospinning fine fibers. The endless chain is preferably made of metal or other conductive material such that it is readily conductive and is in electrical circuit with the high voltage supply through a polymeric solution.

Although, system 600 is depicted with four electrospinning cells, any number of electrospinning cells may be utilized to form fine fibers. For electrospinning nozzle banks, different cells may be effectively formed by pumping different polymer solutions to different nozzles and/or openings in the nozzle bank to thereby generate different fibers.

The electrostatic field is provided by a high voltage supply 636 generating a high voltage differential between the electrodes 620, 622, 624, 626, 628, 629, 630, 631, and the collector 634. As shown, the high voltage supply 636 is connected to the electrodes 620, 622, 624, 626, 628, 629, 630, 631, while the collector 634 is simply grounded, which creates the necessary voltage differential between them for electrospinning fine fibers. A voltage differential between 10,000 and 150,000 volts or more, preferably between 75,000 and 120,000 volts is provided for fine fiber production. In alternative embodiments, both electrodes and collector may be connected to voltage supplies such that the electrodes may not be at such a high voltage potential relative to ground.

The electrospinning cells 614, 616, 618, 619 contain polymeric solutions 638, 640, 642, 643, which are in contact with electrodes 620, 622, 624, 626, 628, 629, 630, 631 to form fine fibers. Each polymeric solution includes at least one suitable polymer and at least one suitable solvent.

Examples of polymers include polyvinyl chloride (PVC), polyolefin, polyacetal, polyester, cellulous ether, polyalkylene sulfide, polyarylene oxide, polysulfone, modified polysulfone polymers and polyvinyl alcohol, polyamide, polystyrene, polyacrylonitrile, polyvinylidene chloride, polymethyl methacrylate, and polyvinylidene fluoride.

Solvents used in polymeric solutions for electrostatic spinning fine fibers may include acetic acid, formic acid, m-cresol, tri-fluoro ethanol, hexafluoro isopropanol chlorinated solvents, alcohols, water, ethanol, isopropanol, acetone, and N-methylpyrrolidone, and methanol. The solvents are selected appropriately according to a polymer solubility and a desired fine fiber size. For example, a mixture of formic acid and acetic acid may be used with polyamide, which is also commonly known as nylon, to produce nylon fine fibers that can have an average fine fiber diameter less than 100 nanometers.

Factors such as a concentration of polymer in polymeric solutions, a solvent make-up of polymeric solutions and a distance between electrodes and substrate effect size of fine fibers. For example, a sufficient distance between electrodes and substrate is necessary to allow evaporation and whipping of fine fiber strands. Preferably, the filter media substrate is separated from the electrospinning electrode usually by at least 3 inches and usually no more than about 10 inches, typically between 4-7 inches. The size of fine fibers may be controlled by varying the distance within these limits, i.e. fine fiber size may be reduced by increasing the distance, thereby allowing more evaporation and whipping.

Further, decreasing the concentration of polymer in a polymeric solution can also reduce the size of fine fibers. A polymeric solution of 8-20% of polymer relative to solvent (that is 92%-80% solvent) is an example of useable range for good fiber formation. More preferably, a solution of about a 12% polymer solution generates good fiber formation and desirably thin fibers. However, a lower concentration of polymer may cause polymeric solution to splatter at the electrodes instead of forming fiber strands.

In one embodiment, the electrospinning cells 614, 616, 618, 619 contains a same polymeric solution to form an electrospun nanofiber media layer comprising fine fibers formed of one polymer. In other embodiments, some or all of the electrospinning cells 614, 616, 618, 619 may contain different polymeric solutions, thereby forming an electrospun nanofiber media layer formed of more than one polymers. For example, polymeric solutions 638 and 642 may comprise nylon 6 and its suitable solvent consisting of ⅔ acetic acid and ⅓ formic acid. In such a solvent, formic acid acts as a dissolving agent to dissolve the polymer, nylon 6, and acetic acid controls conductivity and surface tension of the polymeric solution. On the other hand, polymeric solutions 640 and 643 may comprise PVA and its suitable solvent, water. More cells for one polymer may be provided relative to the other polymer type.

Each of the electrospinning cells 614, 616, 618, 619 forms fine fibers, which are then deposited onto the substrate 606. As shown, the substrate 606 runs between the electrodes 620, 622, 624, 626, 628, 629, 630, 631 and the collector 634 such that the fine fibers formed at the electrodes are deposited on the substrate 606, rather than on collector 634. The collector 634 is perforated to facilitate vacuum suction of evaporated solvent and/or to support the substrate 606 against the collector 634 under suction pressure. As the fine fibers are formed and deposited on the substrate 606, fine fibers are entangled and solvent bonded with each other. In some embodiments, solvent remaining with the fine fibers can effectuate solvent type bonding between fine fibers and the substrate as the solvent evaporates.

In one embodiment, the multi-layer filter media 100 is formed in the system 600 using the melt-blown fiber filter media layer 102 as the substrate 606. As the melt-blown fiber filter media layer 102 moves in the machine direction 613, fine fibers are formed and deposited on the melt-blown fiber filter media 102 forming the melt-blown fiber filter media layer 102. The melt-blown fiber filter media layer 102 and the electrospun nanofiber media layer 104 are initially bonded together via solvent bonding. The solvent type bonding is effectuated when some solvent remaining in the fine fibers comes in contact with the substrate layer and adjacent fibers and ultimately evaporates. The multi-layer filter media 100 then further travels in the machine direction 613 and wound into a roll by the rewind machine 610.

Although not shown in FIG. 6, the multi-layer filter media 100 may further be processed through heated calendaring rollers or an oven to enhance bonding between the melt-blown fiber filter media layer 102 and the electrospun nanofiber media layer 104 through thermal and/or pressure bonding. Thermal bonding is a process of using heat to bond or stabilize a web structure that consists of thermoplastic fibers. In thermal bonding of thermoplastics, parts of the fibers may act as thermal binders. In pressure bonding, filter material is compressed such that interfiber spaces in the filter material are reduced and fine fibers are pressed together wherein the fine fibers are integrated and bonded to the substrate layer. In other embodiments, process of forming the melt-blown fiber filter media layer 102 and forming of the electrospun nanofiber media layer 104 may be performed in one system.

In one embodiment, the multi-layer filter media 200 is formed in the system 600 by using the melt-blown fiber filter media layer 202 as the substrate 606 similar to the method of forming the multi-layer filter media 100 as described above. In this embodiment, the scrim layer 206 is unwind from an unwind station 650 and laminated through a set of pressure rollers 652 onto the electrospun nanofiber media layer 204 soon after the fine fibers forming the electrospun nanofiber media layer 204 are deposited on the melt-blown fiber filter media 202. The bonding between the scrim layer 206 and the electrospun nanofiber media layer 204 may be solvent bonding, pressure bonding and/or heat bonding. In some embodiments, a suitable adhesive may be applied on one surface of the scrim layer 206 then laminated to effectuate adhesive bonding.

Alternatively, the multi-layer filter media 200 may be formed in the system 600 by using the scrim layer 206 as the substrate 606. In this embodiment, the scrim layer 206 travels through the electrospinning apparatus 608, wherein the fine fibers are formed and deposited on the scrim layer 206. As it was with the previous embodiment, the initial bonding between the fine fibers forming the electrospun nanofiber media layer 204 and the scrim layer 206 may be effectuated via solvent bonding. The melt-blown fiber filter media layer 202 is unwound from the unwind roller 650 and laminated through the set of pressure rollers 652 onto the electrospun nanofiber media layer 204 soon after the fine fibers are deposited onto the scrim layer 206. The bonding between the melt-blown fiber filter media layer 202 and the electrospun nanofiber media layer 204 may be solvent bonding, pressure bonding and/or heat bonding. In some embodiments, a suitable adhesive may be applied on one surface of the melt-blown fiber filter media layer 202 then laminated to effectuate adhesive bonding.

In one embodiment, the multi-layer filter media 300 is formed in the system 600. In this embodiment, the melt-blown fiber filter media layer 302 may be prelaminated with the scrim layer 308 and used as the substrate 606, wherein the fine fibers are deposited on the scrim layer 308 side. Alternatively, the scrim layer 308 can be used as the substrate 606 and the melt-blown fiber filter media layer 302 may be unwound from an unwind station 654 and laminated with the scrim layer 308 through a set of pressure rollers 656, as shown in FIG. 6. Once the fine fibers are deposited on the scrim layer 308, the scrim layer 306 is laminated on the electrospun nanofiber media layer 304 through the set of pressure rollers 652. Alternative, the scrim layer 306 may be used as the substrate 606 and the melt-blown fiber filter media layer 302 and the scrim layer 308 may subsequently be laminated after the electrospun nanofiber media layer 304 has been formed via the electrospinning process.

It is contemplated that other multi-layer filter media embodiments, such as the multi-layer filter media 400 and 500, can be formed using the similar methods as described above.

Example and Test Results

A test sample multi-layer filter media is formed according to an embodiment of the present invention. The test sample multi-layer filter media is similarly configured as the multi-layer filter media 300 of FIG. 3 without the optional scrim layer 306. In the test sample multi-layer filter media, the melt-blown fiber filter media layer 302 is formed of Ahlstrom melt-blown polyester media 02-07.7.2, which is commercially available through Ahlstrom Engine Filtration, LLC, of Madisonville, Ky. The Ahlstrom Melt Blown 02-07.7.2 has a thickness of about 1.5 mm, a basis weight of about 95 grams/m$^2$, an average fiber size of between 10-20 microns, and a Frazier porosity at 0.5 inch of water of about 500 CFM.

The scrim layer 308 of the test sample multi-layer filter media is formed of spun-bound polyester Reemay 2817, which is commercially available through Fiberweb Inc., of Old Hickory, Tenn. The Reemay 2817 has a thickness of about 0.2 mm, a basis weight of about 51 grams/m$^2$, average fiber size between about 10-20 microns, and Frazier porosity at 0.5 inch of water of about 518 CFM.

The electrospun nanofiber media layer 304 is formed from a polymeric solution including polyamide-6, formic acid, and glacial acetic acid. The fine fibers of electrospun nanofiber media layer 304 has a median fiber diameter between 50 and 100 nanometers. The electrospun nanofiber media layer 304 of the test sample multi-layer filter media has a thickness of about 200 nm to 500 nm, and a basis weight of about 0.013 grams/m$^2$.

Figure 7:
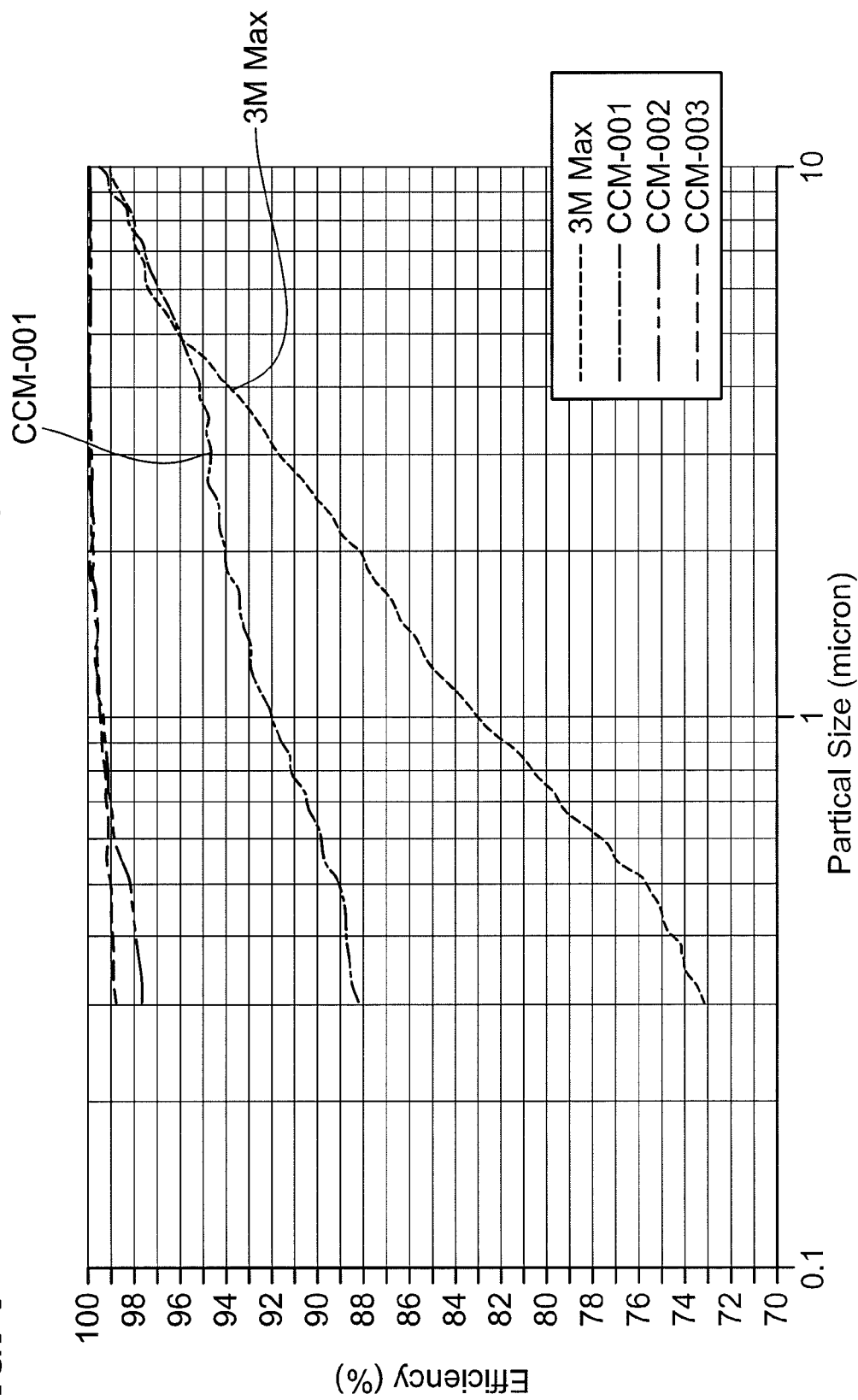
FIG. 7 is a graphical illustration of filtration efficiency test results comparing the multi-layer filter media according to an embodiment of the present invention and other filter medias.

The test sample multi-layer filter media was tested against other filter medias including 3M Max Allergen filter media. FIG. 7 is a graphical illustration of filtration efficiency test results. The filtration efficiency shown in FIG. 7 is comparison of the number of dust particulates with the particle size ranging from 0.3 μm to 10 μm on the upstream and downstream sides of the media measured using PALAS MFP-2000 (Germany) equipment. The filtration efficiency test was performed using ISO Fine dust having 140 mg/m$^3$ dust concentration, a sample testing size of 100$^2$ cm, and face velocity of 10 cm/s. The graph in FIG. 7 compares the filtration efficiency of the test sample multi-layer filter media (indicated as CCM-001) and 3M Max media (indicated as 3M Max). Other sample multi-layer medias prepared in the lab, which include multi layers of the electrospun nanofiber media and multi layers of Reemay 2817 scrim are also tested and shown in the graph. As shown, the test sample multi-layer filter media exhibits superior filtration efficiency over the 3M Max media, especially for less than 4 micron particles. The filtration efficiency difference between two medias increased with decreasing particles size of particles.

Figure 8:
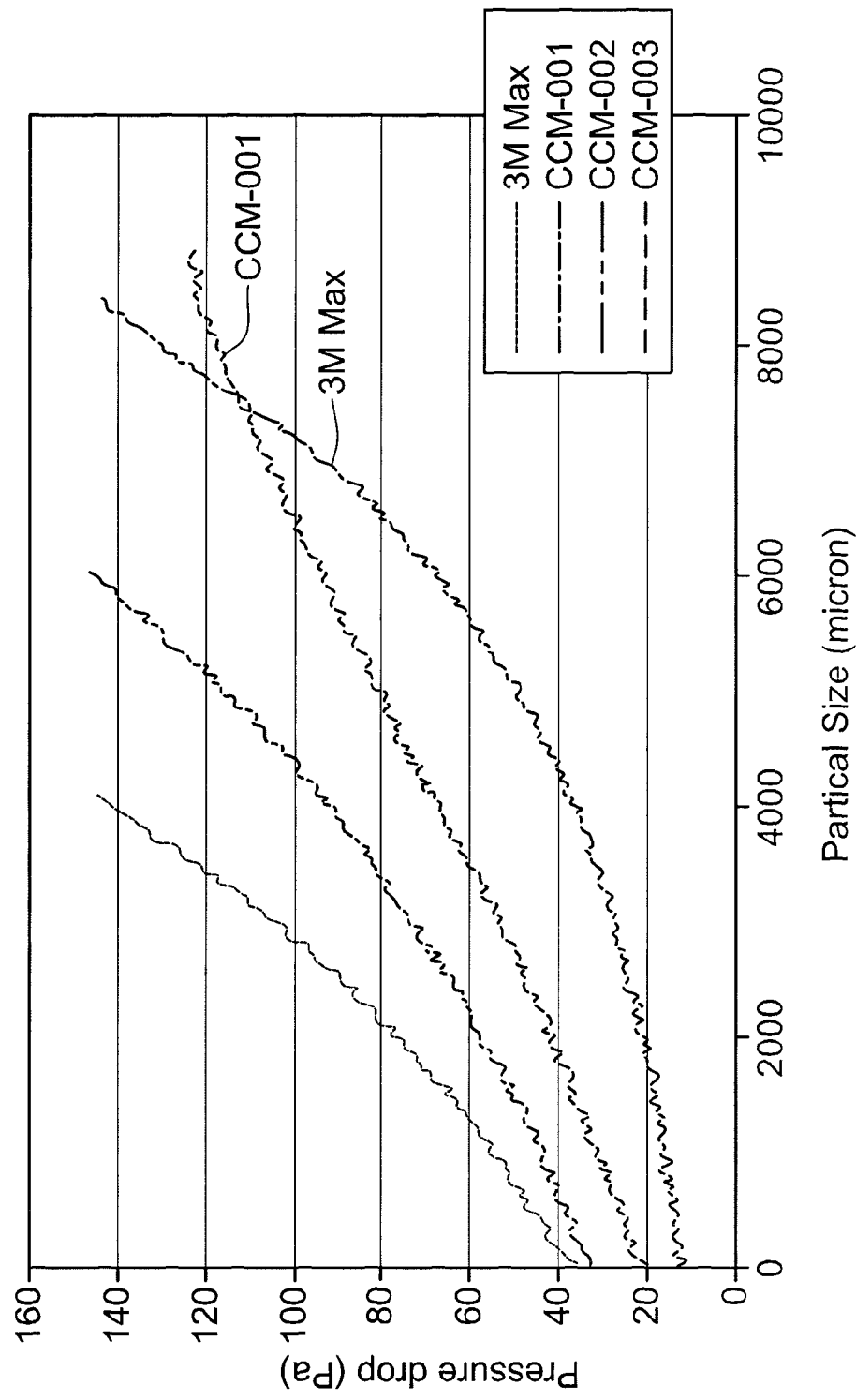
FIG. 8 is a graphical illustration of pressure drop test results comparing the multi-layer filter media according to an embodiment of the present invention and other filter medias.

FIG. 8 is a graphical illustration of drop test results over a period of time. The pressure drop was measured using PALAS MFP-2000 (Germany) equipment and recorded after each dust loading iteration until the final pressure drop reached the setup value of 146 Pa. The pressure drop test was performed using ISO Fine dust having 140 mg/m$^3$ dust concentration, a sample testing size of 100$^2$ cm, and face velocity of 10 cm/s. The graph in FIG. 8 compares the pressure drop of the test sample multi-layer filter media (indicated as CCM-001) and 3M Max media (indicated as 3M Max). The initial pressure drop is the pressure drop measured before the first dust loading iteration. As shown in FIG. 8, the initial pressure drop of the sample multi-layer filter media is less than 22 Pa. Other sample multi-layer medias prepared in the lab, which include multi layers of the electrospun nanofiber media and multi layers of Reemay 2817 scrim are also tested and shown in the graph. As shown, the 3M Max media has a slightly less initial pressure drop than the test sample multi-layer filter media. However, as shown, the rate of pressure drop increase over time for the test sample multi-layer filter media is linear, wherein the 3M Max media exhibits an exponential increase pattern. Therefore, after about 7000 seconds of dust loading, the test sample multi-layer filter media has a lower pressure drop than the 3M Max media, thereby providing the increased filter life.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-layer filter media, comprising:
   at least one melt-blown fiber filter media layer having a basis weight of greater than 40 grams/m$^2$ and a median fiber diameter of at least 1 micron and less than 50 micron; and
   at least one electrospun nanofiber media layer downstream of the at least one melt-blown fiber filter media layer, the at least one electrospun nanofiber media layer comprising fibers having a median fiber diameter of less than 0.8 micron and having a basis weight of greater than 0.010 grams/m$^2$.

2. The multi-layer filter media of claim 1, wherein the at least one melt-blown fiber filter media layer has a layer thickness of at least 1 mm.

3. The multi-layer filter media of claim 1, wherein the basis weight of the at least one melt-blown fiber filter media layer is greater than 70 grams/m².

4. The multi-layer filter media of claim 1, wherein the basis weight of the at least one melt-blown fiber filter media layer is greater than 90 grams/m².

5. The multi-layer filter media of claim 1, wherein the at least one melt-blown fiber filter media has Frazier air permeability at a differential pressure of 0.5 inch of water between 400 CFM and 600 CFM.

6. The multi-layer filter media of claim 1, wherein the multi-layer filter media has an initial pressure drop of less than 22 Pa.

7. The multi-layer filter media of claim 1, further comprising a first scrim layer, wherein the at least one melt-blown fiber media layer includes a first melt-blown fiber media layer and the at least one electrospun nanofiber media layer includes a first electrospun nanofiber media layer, wherein the first electrospun nanofiber media layer is electrospun and on a downstream surface of the first melt-blown fiber filter media layer, wherein the first scrim layer is bonded to and downstream of the first electrospun nanofiber media, wherein the multi-layer filter media comprises at least three layers including the first melt-blown fiber filter media upstream of the first electrospun nanofiber filter media and the first scrim layer downstream of the first electrospun nanofiber media layer.

8. The multi-layer filter media of claim 1, further comprising a first scrim layer, wherein the at least one melt-blown fiber media layer includes a first melt-blown fiber media layer and the at least one electrospun nanofiber media layer includes a first electrospun nanofiber media layer, wherein the first electrospun nanofiber media layer is electrospun and on a downstream surface of the first scrim layer, wherein the multi-layer filter media comprises at least three layers including the first melt-blown fiber filter media upstream of the first scrim layer, and the first electrospun nanofiber filter media downstream of the first scrim layer.

9. The multi-layer filter media of claim 8, wherein the first scrim layer has thickness of at least 0.1 mm and less than 0.5 mm, average fiber size between 1 micron and 50 micron, and Frazier air porosity at 0.5 inch of water between 500 CFM and 600 CFM.

10. The multi-layer filter media of claim 8, wherein the multi-layer filter media has a thickness between 1.5 mm and 2 mm, a filtration efficiency greater than 90% for 1 micron particle size, and an initial pressure drop of less than 22 Pa.

11. The multi-layer filter media of claim 1, further comprising a first scrim layer and a second scrim layer, wherein the at least one melt-blown fiber filter media layer includes a first melt-blown fiber media layer and the at least one electrospun nanofiber media layer includes a first electrospun nanofiber media layer, wherein the multi-layer filter media comprises at least four layers including the first scrim layer bonded to a downstream surface of the first melt-blown fiber media layer, the first electrospun nanofiber layer electrospun on a downstream surface of the first scrim layer, and the second scrim layer bonded to a downstream surface of the first electrospun nanofiber layer.

12. The multi-layer filter media of claim 11, further comprising a second melt-blown fiber filter media layer bonded to upstream of the first melt-blown fiber filter media layer.

13. The multi-layer filter media of claim 1, further comprising a first scrim layer, wherein the at least one melt-blown fiber filter media layer includes a first melt blown fiber filter media layer and a second melt-blown fiber filter media layer, and the at least one electrospun nanofiber media layer includes a first electrospun nanofiber media layer, wherein the multi-layer filter media comprises at least four layers including the second melt-blown fiber filter layer bonded to a downstream surface of the first melt-blown fiber filter media layer, and the first electrospun nanofiber media layer electrospun and on a downstream surface of the second melt-blown fiber filter media layer, and the first scrim layer bonded to a downstream surface of the first electrospun nanofiber layer.

14. The multi-layer filter media of claim 1, further comprising a first scrim layer, wherein the at least one melt-blown fiber filter media layer includes a first melt blown fiber filter media layer and a second melt-blown fiber filter media layer, and the at least one electrospun nanofiber media layer includes a first electrospun nanofiber media layer, wherein the multi-layer filter media comprises at least four layers including the second melt-blown fiber filter layer bonded to a downstream surface of the first melt-blown fiber filter media layer, and the first electrospun nanofiber media layer electrospun on an upstream surface of the scrim layer, and an upstream surface of the first electrospun nanofiber media layer bonded to a downstream surface of the second melt-blown fiber filter media layer.

15. The multi-layer filter media of claim 1, wherein the multi-layer filter media is formed in a consolidated structural configuration.

16. The multi-layer media of claim 15, wherein the multi-layer filter media is pleated.

17. The multi-layer filter media of claim 1 wherein the at least one melt-blown fiber filter media layer is depth loaded.

18. The multi-layer filter media of claim 17 wherein the at least one electrospun nanofiber media layer is depth loaded.

19. A method of forming a multi-layer filter media, comprising steps of:
providing a melt-blown fiber filter media layer by melt blowing a web of a polymer fibers having a median fiber diameter of at least 1 micron and less than 50 micron to form the melt-blown fiber filter media layer having a basis weight of greater than 40 grams/m²;
providing a nanofiber media layer by electrospinning nanofibers having a median fiber diameter of less than 0.8 micron to form the nanofiber layer having a basis weight of greater than 0.010 grams/m²; and
bonding the nanofiber layer to downstream of the melt-blown fiber filter media layer.

20. The method of claim 19, wherein bonding the nanofiber media layer comprises electrospinning nanofibers onto a downstream surface of the melt-blown fiber filter media layer.

21. The method of claim 19, wherein bonding the nanofiber media layer comprises electrospinning nanofibers onto a downstream surface of a scrim layer, and laminating the melt-blown fiber onto a upstream surface of the scrim layer.

22. The method of claim 19, further including enhancing bonding between layers of the multi-layer filter media by pressure bonding, wherein the multi-layer filter media is compressed through a set of calendaring rollers.

23. The method of claim 19, further including enhancing bonding between layers of the multi-layer filter media by heat bonding, wherein the multi-layer filter media is heated to a glass transition temperature of a polymer comprising the nanofiber media layer.

* * * * *